INVENTOR:
FRED W. KELLEY, JR.
BY Albert S. Richardson Jr.
ATTORNEY 3,490,030
TRANSFORMER LIMITED RANGE
CONTROL CIRCUITRY
Fred W. Kelley, Jr., Media, Pa., assignor to General
Electric Company, a corporation of New York
Filed June 7, 1967, Ser. No. 644,158
Int. Cl. G05f 1/40, 1/24
U.S. Cl. 323—22                                      9 Claims

ABSTRACT OF THE DISCLOSURE

In order economically to control or to regulate, within a relatively limited range, the magnitude of alternating voltage supplied by a source of A-C electric power to a load circuit with the aid of silicon controlled rectifiers (SCR's) but without imposing full-load current handling duty on the SCR's, a transformer having a source winding and a buck/boost load winding is provided, and first and second pairs of inverse-parallel SCR's are used to switch the polarity of the source winding at some point of time during each half cycle of load current in a manner that advances the apparent power factor angle of the load circuit. The apparatus includes means operative at the desired point for commutating the SCR's of the first pair off and for commutating the SCR's of the second pair on.

BACKGROUND OF THE INVENTION

This invention relates to electric power supplying apparatus and, more particularly, to apparatus combining electronic switching devices and a transformer for controlling or regulating the magnitude of alternating voltage or other electrical condition of a load circuit.

In many applications requiring an adjustable electrical power supply, for example in the control of an electrochemical process, it is necessary to exert only a relatively small range of control of the total load voltage or other electrical characteristic by continuous adjustment. Such control has been effected in the past by the well-known amplistat and also through the use of electronic tap-changing techniques utilizing switching devices which permit, in effect, changing the influence of a regulating winding of an in-circuit transformer at a predetermined phase angle for each half cycle such that the average of the electrical characteristic which is to be controlled becomes that desired.

The present invention is directed toward the buck/boost transformer approach to partial voltage control. The usefulness of prior art regulators of this kind, including those utilizing SCR's or related controlled switching means for controlling the transformer connections, has generally been limited because the fundamental component of load current inherently lags source voltage. This characteristic is undesirable where the electric load with which such a regulator is used is resistive or inductive in nature, in which case the efficiency of the net power delivery is substantially lower than ideal to an extent that additional apparatus to correct power factor may become an economic necessity for an industrial user.

SUMMARY OF THE INVENTION

It is therefore an object of this invention to provide variable voltage apparatus which can introduce a leading power factor to A-C electrical energy delivered to a load to obviate or mitigate the necessity of providing additional means for correcting power factor.

It is a further object of this invention to provide such regulating apparatus in which solid-state switching elements are required to handle only a fraction of full-load current such that their ratings can be commensurately lower to realize manifest economic advantages in both actual cost and the physical size of the switching elements.

These objects are achieved, according to one embodiment of the present invention, by providing a transformer with a center-tapped source winding and a load winding, the latter having substantially less turns than the former and being disposed electrically in series with a load, and the former being controlled such that a small current component from the source will flow through one or the other side of the winding halves to induce a relatively low voltage in the load winding that boosts or bucks the source voltage supplied to the load. The average effect of the induced voltage on the magnitude of load voltage is a function of the phase angle at which the current flowing in the source winding is switched from one winding half to the other.

In the exemplary embodiment, the source winding center-tap is connected to one side of an A-C power source, and bidirectionally conductive controlled switching means, comprising two pairs of inverse-parallel SCR's, are respectively connected from opposite ends of the source winding to the other side of the A-C power source which may conveniently be observed as a reference point. A commutating capacitor is connected directly across the whole of the source winding. The control electrodes of the four SCR's are individually triggered by suitable gate pulse generating circuits synchronized with the A-C load current and responsive to manual or automatic condition-indicating signals to deliver appropriately timed gate pulses to the SCR's.

Typically, each SCR in one pair is triggered into conduction at the beginning of a load current half cycle when its anode voltage is or is becoming positive to permit a current component to flow through a first half of the center-tapped source winding in the proper direction to induce a boosting voltage in the load winding. The commutating capacitor, by transformer action, charges to substantially twice the voltage developed across the first winding half. At a predetermined moment of time during the current half cycle, the corresponding SCR in the other pair is momentarily triggered to enable the capacitor to discharge and hence quickly to quench the previously conducting SCR of the one pair. Leakage inductance between the source winding halves absorbs part of the capacitor voltage during this commutating process, thereby ensuring that the capacitor plate to which the former SCR is connected will tend to reverse polarity with respect to said reference point. This extinguishes the corresponding SCR and enables the opposite SCR of said other pair, which concurrently is triggered, to become conductive for the remainder of that load current half cycle. The current in the second half of the source winding is, in effect, now pumped against the A-C power source to provide a bucking effect in the load winding, thereby reducing voltage across the load. At the end of the half cycle, the latter SCR is naturally commutated off when its anode current drops to zero.

By using the apparatus summarized above, the given voltage of the source will be augmented during a preselected first portion of each half cycle of load current and reduced during the remainder of that half cycle. This results in advancing the relative phase angle of the fundamental component of load current with respect to what it would be without my buck/boost arrangement. Consequently, a load circuit that is in fact essentially resistive will appear to the source as a leading power-factor load, while an inductive load circuit can be made to appear as a unity power-factor load.

The subject matter of the invention is particularly pointed out and distinctly claimed in the concluding portion of the specification. The invention, however, both as to organization and method of operation, may best be understood by reference to the following description taken in connection with the accompanying drawing in which:

Figure 1:
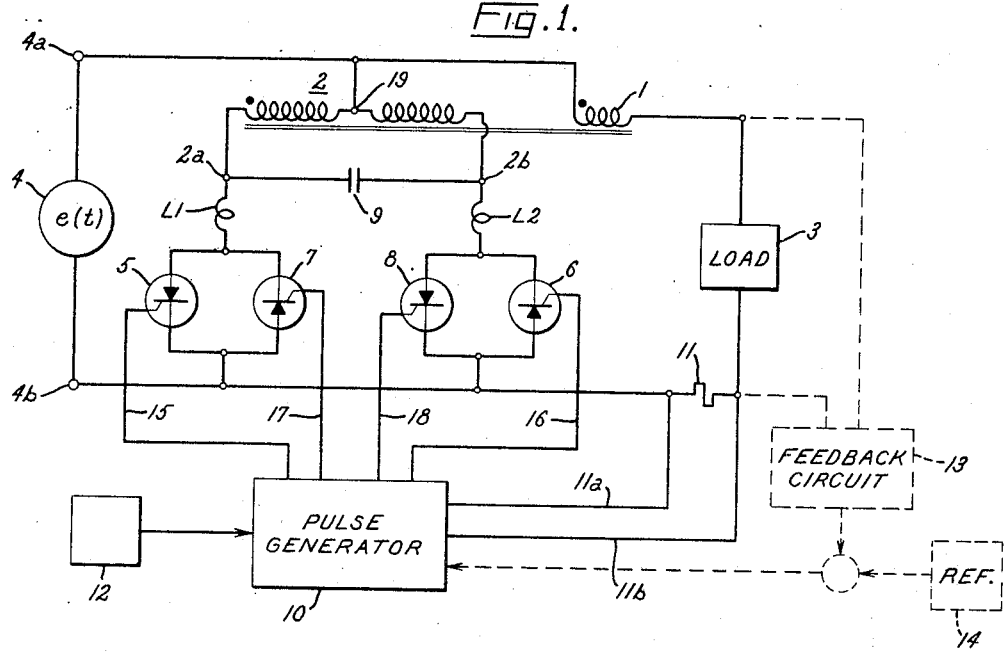
FIGURE 1 is a schematic diagram of an exemplary embodiment of the invention in which load voltage control is exercised.

Referring now to FIGURE 1, there is shown electrical apparatus which includes a transformer having a load winding 1 magnetically coupled to a center-tapped source winding 2. The source winding has substantially more turns than the load winding, e.g. 4:1. An electrical load circuit 3, assumed resistive for this example, is disposed in series with the load winding 1 across a pair of input terminals 4a and 4b which are adapted to be connected to an A-C power source 4. Two pairs of inverse-parallel SCR's 5 and 7 and 6 and 8 are connected between two end terminals 2a and 2b of the center-tapped winding 2 and one side of the A-C power source 4, which side corresponds to the input terminal 4b and may be considered as a voltage reference point in explaining the invention. A commutating capacitor 9 is disposed in parallel across the whole of the center-tapped source winding 2. If desired, small inductance means L1 and L2 are included in series with the respective SCR pairs for softening the time rate of change of anode current ($di/dt$).

The SCR's 5–8 are sequentially triggered into conduction by means of a pulse generator 10. In order to synchronize the gate pulses with load current, conductors 11a and 11b to the generator 10 are energized by an in-phase signal. Such a signal can be taken from a current transformer or a small voltage dropping resistor 11 in series into the load, or alternatively from the input terminals 4a and 4b if the load is purely resistive. The resulting output signals or pulses from the pulse generator 10 are coupled to the control electrodes or gates of the SCR's 5, 6, 7, and 8 via conductors 15, 16, 17, and 18 respectively.

Gate pulses for SCR's 5 and 7 are respectively generated at the beginning of successive half cycles of load current, while those for SCR's 6 and 8 are generated at a predetermined moment of time during these half cycles. This moment can be controlled in accordance with the magnitude of an input signal supplied to the generator 10 by suitable means 12, or, alternatively, by the error or difference between the magnitude of a feedback signal representative of load voltage and the magnitude of a desired reference signal. As is shown by broken lines in FIGURE 1, the feedback signal can be derived by a feedback circuit 13 connected to the load terminals, and the reference signal is supplied by external reference means 14.

Figure 2:
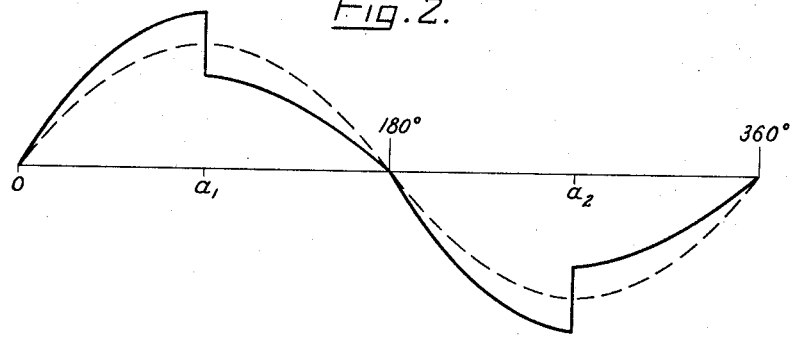
FIGURE 2 is a typical voltage waveform as observed across a resistive load for a full cycle of the A-C source voltage.
Figure 3:
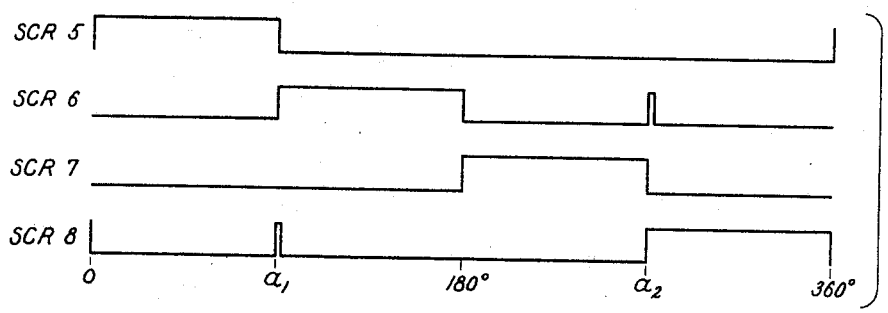
FIGURE 3 is a representation of typical conduction intervals for each of four SCR's utilized as the controlled switching means in the circuit of FIGURE 1 to achieve the voltage waveforms of FIGURE 2.

For convenience, my invention will be explained for the case in which near maximum regulating effect is sought; i.e., the case in which each of the SCR's conducts source winding current for approximately a quarter of each cycle. The resultant voltage supplied to the load is represented by the solid line of FIGURE 2 in which the dashed line represents the given alternating voltage of the source 4. While FIGURE 3 is, strictly speaking, a diagram of the conducting intervals for the several SCR's for the exemplary case, these may also be considered as satisfactory firing signals delivered to the gates of the SCR's from the pulse generator 10. As a practical matter, it will be understood by those skilled in the art that SCR conduction can be initiated by pulses of quite short, though finite, duration, and once a given SCR is successfully "turned on" it will continue to conduct until its anode current becomes zero or negative.

In operation, the SCR 5 is triggered on at the beginning of each positive half cycle of load current and will remain on for a preselected first portion of that half cycle, determined by the regulating effect desired as reflected in the control signal supplied to the pulse generator 10. Current of relatively low magnitude will flow from the positive input terminal 4a of the A-C power source 4 into the source winding center-tap 19, through the left half of the source winding 2, and through the SCR 5 to the negative input terminal 4b. The transformer load winding 1 is so poled that the voltage induced therein while SCR 5 is conducting aids or boosts the source voltage to achieve the desired leading power factor characteristic of the electrical energy presented to the load 3. It will be observed that the commutating capacitor 9 charges to substantially twice the source voltage because of the transformer effect on the right half of the winding 2.

At the conclusion of the first portion of the positive half cycle of load current, the pulse generator 10 delivers gate pulses to the SCR's 6 and 8. The SCR 8 can fire because its anode is, at this instant, positive with respect to its cathode by the voltage to which the commutating capacitor 9 has charged. When the SCR 8 begins to conduct, the instantaneously positive plate of the capacitor 9 is effectively clamped to the reference side of the A-C power source 4, and the opposite plate is thereby forced negative with respect to the reference voltage point to drive the anode of SCR 5 negative with respect to its cathode. The capacitor 9 discharges through the SCR 8 very quickly, thereby diverting anode current from the SCR 5 which consequently stops conducting. The inductance L2 and the leakage inductance between the two halves of the source winding 2 provide an oscillatory effect with the capacitor that aids in effecting a reversal of capacitor voltage that commutates off the SCR 8 and at the same time engenders conduction of the preconditioned SCR 6. Where necessary, leakage inductance can be complemented by adding inductance in the path that connects the transformer to the common junction of input terminal 4a and load winding 1.

The SCR 6 will remain in its conducting state during the remainder of the positive half cycle of load current. Compensating current must flow through SCR 6 and through the right half of the source winding 2 to maintain the requisite equality of ampere turns between the source and load windings of the transformer. Since the no-dot terminal of its right half is connected to the terminal 4b of the A-C power source 4, the source winding 2 is now energized in a sense that results in voltage across the load winding 1 having a subtractive or bucking effect. The reduced voltage supplied to the load 3 for the remainder of the positive half cycle is represented by the solid line of FIGURE 2 from the angle $\alpha_1$ to 180°.

At the end of the positive half cycle, the current in the SCR 6 falls to zero, and this device therefore ceases to conduct. As the negative half cycle of load current commences, the pulse generator 10 issues a firing pulse to the gate electrode of the SCR 7 which turns on because its anode voltage is now becoming positive. It will be observed that with the concurrent reversals of load current and of the source winding connections, a boosting voltage is again induced in the load winding 1, and there is a commensurate increase in the instantaneous magnitude of voltage appearing across the load.

As current flows through the SCR 7 and the left portion of the source winding 2, the commutating capacitor 9 charges to substantially twice the source voltage 2 because of the transformer effect on the right half of the winding 2. At a predetermined moment of time during the negative half cycle of load current (shown as firing angle $\alpha_2$ in FIGURES 2 and 3), the pulse generator 10 issues gate pulses to the SCR's 6 and 8. The SCR 6 can fire at this instant because its anode is positive with respect to its cathode by the voltage to which the capacitor 9 has charged. When the SCR 6 begins to conduct, the charged capacitor 9 will divert the SCR 7 current quite rapidly but with a controlled time rate of change due to the inductances L1 and L2, and thus the previously conducting SCR 7 is commutated off.

In a manner analogous to the circuit operation described above for the positive half cycle, the capacitor 9 discharges through the SCR 6 very quickly, and inductance means L2 in combination with the transformer source winding leakage inductance provides an oscillatory effect with the capacitor that aids in reversing the current in L2 which commutates SCR 6 off and simultaneously engenders turn-on of the gated SCR 8. A relatively small component of current must now flow from center tap 19 through the right half of the source winding 2 and through the SCR 8 during the remainder of the negative half cycle of load current. Again, the net result is a bucking voltage in the load winding 1 and a decreased voltage delivered to the load 3, as is represented by the solid line in FIGURE 2 between $\alpha_2$ and 360°.

At the end of the negative half cycle of load current, the succeeding positive half cycle commences and the events described above are repeated for each alternate and intermediate half cycle which follows, with the firing angles $\alpha_1$ and $\alpha_2$ being varied as desired to achieve the necessary regulation or any small-range variation in the magnitude of load voltage.

It will be readily apparent to those skilled in the art that, while the active switching elements shown in FIGURE 1 are SCR's, other switching devices, such as Triacs, may be substituted for the SCR's under appropriate conditions. Thus, modifications to the specifically disclosed embodiment of the invention and other embodiments thereof may occur to those skilled in the art which do not depart from the spirit and scope of the invention. Accordingly, it is intended to cover herein all embodiments of and modifications to the invention which do not depart from the spirit and scope of the invention.

What I claim as new and desire to secure by Letters Patent of the United States is:

1. Electrical apparatus for supplying alternating voltage of controllable magnitude to an electric load circuit comprising:
   (a) a pair of input terminals adapted to be connected to a source of given alternating voltage;
   (b) a transformer having first and second magnetically coupled windings, said second winding having first and second electrically spaced terminals;
   (c) first current conducting means for connecting said load circuit to said input terminals with said first winding being disposed electrically in series with the load circuit, whereby the alternating voltage supplied to said load circuit comprises the source voltage modified in accordance with the voltage induced in said first winding;
   (d) second current conducting means for connecting said second winding between said input terminals, said second means including
      (i) first bi-directionally conductive controlled switching means connected between the first terminal of said second winding and one of said input terminals, and
      (ii) second bi-directionally conductive controlled switching means connected between the second terminal of said second winding and said one input terminal; and
   (e) means for so controlling said first and second switching means that said first switching means is in a conducting state only during a preselected first portion of each half cycle of current in said first current conducting means and said second switching means is in a conducting state during the remainder of each half cycle;
   (f) said first winding being so poled that the voltage induced therein while said first switching means is conducting boosts said source voltage and the voltage induced therein while said second switching means is conducting bucks said source voltage.

2. The apparatus of claim 1 in which said control means (subheading (e)) comprises triggering means for initiating conduction by the respective switching means, and commutating means for forcing said first switching means to stop conducting when conduction by said second switching means is initiated by said triggering means.

3. The apparatus of claim 2 in which said commutating means comprises a capacitor connected electrically in parallel with said second winding, and said second current conducting means includes inductance means in series with said second switching means.

4. The apparatus of claim 1 in which said first and second switching means respectively comprise first and second pairs of inverse-parallel semiconductor controlled rectifiers, and said control means comprises:
   (i) triggering means for initiating conduction by one of the rectifiers forming said first pair at the beginning of alternate half cycles of current in said first means, for preconditioning the opposite rectifier in said second pair to conduct at the conclusion of said preselected first portion of the alternate half cycles, for initiating conduction by the other rectifier in said first pair at the beginning of intermediate half cycles of current, and for preconditioning the remaining rectifier of said second pair to conduct at the conclusion of said preselected first portion of the intermediate half cycles;
   (ii) commutating means for forcing the rectifiers of said first pair to stop conducting at the conclusion of the first portion of the respective half cycles; and
   (iii) means for forcing the rectifiers of said second pair to start conducting while preconditioned by said triggering means.

5. The apparatus of claim 4 in which said commutating means comprises a capacitor connected electrically in parallel with said second winding and means for momentarily triggering the corresponding rectifier in the second pair at the conclusion of the first portion of the respective half cycles.

6. An electrical regulator system comprising: means for connecting the system to an alternating current supply circuit; means for connecting the system to an alternating current load circuit; a transformer comprising first and second windings, said first winding being electrically disposed in series with the alternating current load circuit across the alternating current supply circuit; said second winding being provided with a plurality of electrically spaced terminals including a first terminal, a second terminal, and a third terminal, said third terminal being electrically disposed intermediate said first and second terminals and connected to a first side of the alternating current supply circuit; first switching means connected between said first terminal and a second side of the alternating current supply circuit; second switching means connected between said second terminal and the second side of the alternating current supply circuit; and means for forcing the net current flowing in said second winding to transfer between said first and second switching means at predetermined phase angles.

7. The electrical regulator system of claim 6 which includes a capacitor connected between said first and second terminals.

8. Apparatus for supplying alternating voltage to an electric load circuit comprising:
   (a) a set of input terminals adapted to be connected to a source of given alternating voltage;
   (b) a transformer having first and second windings, said second winding having substantially more turns than said first winding;

(c) first current conducting means for connecting said load circuit to said input terminals with said first winding being disposed electrically in series with the load circuit, whereby the alternating voltage supplied to said load circuit comprises the source voltage modified in accordance with the voltage induced in said first winding;

(d) second current conducting means for connecting said second winding to said first means, said second means including
  (i) first switching means operative to cause said second winding to be energized in a sense that results in a boosting voltage being induced in said first winding, and
  (ii) second switching means operative to cause said second winding to be energized in an opposite sense, whereby a bucking voltage can be induced in said first winding;

(e) means for initiating operation of said first switching means at the beginning of each half cycle of load current in said first current conducting means; and (f) means for forcing said first switching means to stop operating and for effecting operation of said second switching means at a controllable point of time during each current half cycle.

9. In combination:
(a) first and second input terminals adapted to be energized by a given alternating voltage;
(b) a pair of load terminals adapted to be connected to an electric load circuit;
(c) a transformer having a source winding and a load winding;
(d) means including said load winding for conductively interconnecting said input and load terminals, whereby the voltage across said load terminals comprises the given alternating voltage modified in accordance with the voltage induced in said load winding;
(e) first switching means operative to connect said source winding to said input terminals with a relative polarity that results in a boosting voltage being induced in said load winding;
(f) second switching means operative to connect said source winding to said input terminals with the opposite polarity, whereby a bucking voltage can be induced in said load winding;
(g) means for initiating operation of said first switching means at the beginning of each half cycle of current in said interconnecting means;
(h) means for forcing said first switching means to stop operating and for effecting operation of said second switching means at some moment of time during each current half cycle;
(i) said second switching means being constructed and arranged to stop operating at the end of each current half cycle; and
(j) means for determining when said moment of time occurs, whereby the magnitude of voltage across the load terminals can be controlled.

References Cited

UNITED STATES PATENTS

| | | | |
|---|---|---|---|
| 1,893,767 | 1/1933 | FitzGerald et al. | 323—45 |
| 1,893,780 | 1/1933 | Lyman | 323—45 |
| 1,914,193 | 6/1933 | Bedford | 323—45 X |
| 1,947,197 | 2/1934 | Garman | 323—45 |
| 3,319,153 | 5/1967 | Livingston | 323—24 X |
| 3,384,807 | 5/1968 | Klein et al. | 323—22 |

LEE T. HIX, Primary Examiner

G. GOLDBERG, Assistant Examiner

U.S. Cl. X.R.

323—24, 34, 45, 58